US007225398B1

(12) United States Patent
Jones et al.

(10) Patent No.: US 7,225,398 B1
(45) Date of Patent: May 29, 2007

(54) USING ICONS TO SHOW THE VALIDITY OF COMPUTER LANGUAGE STRUCTURAL ELEMENTS APPLICABLE TO A COMPUTER-GENERATED DOCUMENT

(75) Inventors: Brian Jones, Redmond, WA (US); Marcin Sawicki, Kirkland, WA (US); Robert Little, Redmond, WA (US); Mark Sunderland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 10/180,666

(22) Filed: Jun. 26, 2002

(51) Int. Cl.
    *G06N 3/00* (2006.01)
(52) U.S. Cl. ..................................... 715/513
(58) Field of Classification Search ................. 715/513, 715/503, 517, 523, 530
    See application file for complete search history.

(56) References Cited

U.S. PATENT DOCUMENTS

| | | | |
|---|---|---|---|
| 6,681,370 B2 * | 1/2004 | Gounares et al. ........... | 715/513 |
| 6,721,727 B2 * | 4/2004 | Chau et al. .................. | 707/3 |
| 6,779,154 B1 * | 8/2004 | Nussbaum et al. ......... | 715/523 |
| 2002/0038320 A1 | 3/2002 | Brook ......................... | 715/513 |
| 2002/0147748 A1 | 10/2002 | Huang et al. ............... | 715/517 |
| 2002/0161801 A1 | 10/2002 | Hind et al. ................. | 715/513 |
| 2003/0041076 A1 * | 2/2003 | Lucovsky et al. .......... | 707/500 |
| 2003/0071782 A1 * | 4/2003 | Martinez .................... | 345/156 |
| 2005/0022115 A1 | 1/2005 | Baumgartner et al. ...... | 715/513 |

FOREIGN PATENT DOCUMENTS

WO  WO 94/14122  6/1994

OTHER PUBLICATIONS

Jin et al., "A Structure- and Content-Based Multimedia Information Retrieval System for XML Documents," *IT Management in the 21st Century*, 2000 IRMA International Conference, pp. 342-346.
Beagle, "Visualization of Metadata," *Information Technology and Libraries*, vol. 18, No. 4, Dec. 1999, pp. 192-199.

(Continued)

*Primary Examiner*—Stephen Hong
*Assistant Examiner*—Kyle R. Stork
(74) *Attorney, Agent, or Firm*—Merchant & Gould

(57) ABSTRACT

A method and system are provided for using icons to show the validity of markup language elements applicable to a computer-generated document. A user of a computer-generated document such as a word processing document attaches a schema to the document setting out the rules and procedures with which the document may be annotated with markup language elements for structuring portions of the document. According to one aspect of the invention, the user attaches an Extensible Markup Language (XML) schema to the document for setting the data types, data structures and XML elements rules for the document so that the user may annotate the document with XML structure. When the user begins to annotate the document with a desired markup language structure, such as XML structure, an application pane is displayed to the user to provide the user with assistance in applying allowable XML elements at allowable locations and in allowable order and number. A series of icons are presented alongside the presented elements in the application pane to indicate the level of validity of a given element based on the editing context and location in the document.

48 Claims, 4 Drawing Sheets

OTHER PUBLICATIONS

U.S. Appl. No. 10/377,581 entitled, Method and System for Showing Unannotated Text Nodes in a Data Formatted Document, filed Feb. 28, 2003.

Microsoft Press Computer Dictionary, 3rd Edition, 1997 Microsoft Corporation, printout pp. 1-5.

European Search Report dated Feb. 22, 2006.

D. Greenwood, "XMetal 3 Overview," Online publication, Dec. 21, 2002, XP-002364996, http://web.archive.org/web/20021221172046/http://www.online-learning.com/papers/EditorsReport/XmetalOverview.html.

D. Greenwood, "FrameMaker Structure View," Online publication, Dec. 21, 2002, XP-002364999, http://web.archive.org/web/20021221172825/http://www.online-learning.com/papers/EditorsReport/FMStructureView.html.

Michel Rodriguez et al., "XML In WordPerfect 9: A User's View," Online publication, May 31, 2000, XP-002364998, http://www.xml.com/pub/a/2000/05/31/wordperfect/index2.html.

D. Greenwood, "FrameMaker Elements and Attributes," Online publication, Dec. 21, 2002, XP-002364997, http://www.online-learning.com/papers/EditorsReport/FMElementAtributes.html.

Luke McDowell et al., "Evolving the Semantic Web with Mangrove," Technical Report of the University of Washington, Online publication, Feb. 1, 2003, XP-002365000, http://norfolk.cs.washington.edu/htbin-post/unrestricted/tr/list.cgi?sortby-date.

\* cited by examiner

USING ICONS TO SHOW THE VALIDITY OF COMPUTER LANGUAGE STRUCTURAL ELEMENTS APPLICABLE TO A COMPUTER-GENERATED DOCUMENT

FIELD OF THE INVENTION

This invention relates to a method and system for using icons to show the validity of markup elements applicable to a computer-generated document.

BACKGROUND OF THE INVENTION

Computer software applications allow users to create a variety of documents to assist them in work, education, and leisure. For example, word processing applications allow users to create letters, articles, books, memoranda, and the like. Spreadsheet applications allow users to store, manipulate, print, and display a variety of alpha-numeric data. Such applications have a number of well-known strengths, including rich editing, formatting, and calculation.

To keep up with demand for more advanced functionality for such computer software applications, software developers have begun to use markup languages to allow users to annotate a software application document to give the document a useful structure apart from the normal functionality of the software application responsible for creating the document or the visible formatting associated with the document. For example, a user may wish to create on her word processing application a template document for preparation of a resume, a will, or an article that she wishes to transmit to a publisher. By applying structure to the document, persons or institutions receiving the document may make use of the structure by processing the document to utilize data defined by the document structure.

For example, some word processing applications allow users to annotate a word processing document with Extensible Markup Language (XML) elements so that the user may define certain data types and data definitions for data inserted into the document. If the user has prepared a resume document, the user may annotate the resume document with XML elements to define certain allowable data structures and data types within the document. A resume document, for example, may include an "experience" section in which the user will include present and past work experience. Using XML, the user may desire to annotate the "experience" section of the document to define that certain allowable information in a prescribed order in a prescribed number may be included in the "experience" section of the document. For example, the user may wish to annotate the "experience" section of the document to allow for no more than four present or past experience items.

By annotating a document such as a resume document with a structure, as defined, for example by using XML, the user or a recipient of the document may develop software applications for reading the user's document and for making use of data defined by the structure. For example, a user may prepare an article document to send to a publisher of the article, and the user may annotate the article document with XML structure to define certain sections of the article such as the "title" and the "body" of the article. The publisher may develop computer software applications for reading the article document and for extracting the data such as text or images included within a given structure. For example, the publisher may write a computer software application that will read the user's article document and extract the text and images associated with the "body" section without regard to other structure or content contained in the document.

Unfortunately, most users of such computer software applications do not have the requisite understanding of markup languages, such as XML, in order to correctly apply allowable markup language elements to a document. Therefore, there is a need for a method and system for providing a user with help functionality for assisting the user in annotating a document with desired markup language elements for adding structure to the document. It is with respect to these and other considerations that the present invention has been made.

SUMMARY OF THE INVENTION

Embodiments of the present invention provide a method and system for using icons to show the validity of markup elements applicable to a computer-generated document. A user of a computer-generated document such as a word processing document associates a schema with the document setting out the rules and procedures with which the document may be annotated with markup elements for structuring portions of the document. According to one aspect of the invention, the user attaches an Extensible Markup Language (XML) schema to the document for setting the data types, data structures and XML elements rules for the document so that the user may annotate the document with XML structure. Alternatively, the user may receive a document that has an XML schema attached to or associated with the document.

When the user begins to annotate the document with a desired markup language structure, such as XML structure, an application pane is displayed to the user to provide the user with assistance in applying allowable XML elements at allowable locations and in allowable order and number. The user may elect to have shown in the application pane all elements potentially applicable under the schema governing the document. Alternatively, the user may elect to only have shown allowable elements that may be applied based on the editing context and location in the document.

A series of icons may be presented alongside the presented element in the application pane to indicate the level of validity of a given element based on the editing context and location in the document. For example, if the user places the computer cursor in the <name> section of a document, the application pane may show <first name> and <last name> with an associated icon indicating that both those elements are required according to the schema associated with the document. On the other hand, if the user has elected to show all potential elements, an element such as <date> may be shown, but an icon indicating that the <date> element is not allowed in the <name> section may be presented to alert the user that she should not apply the <date> element in this section of the document according to the schema associated with the document. Other icons may be presented to alert the user that an element is allowed, but that the user has exceeded a maximum number of this type of element, or an icon may be presented to alert the user that an element is allowed, but in a different order, or an icon may be presented to indicate that a certain number of elements of this type should be applied in this location of the document.

These and other features, advantages, and aspects of the present invention may be more clearly understood and appreciated from a review of the following detailed description of the disclosed embodiments and by references to the appended drawings and claims.

DETAILED DESCRIPTION

The following description of an embodiment of the present invention is made with reference to the above-described drawings wherein like numerals refer to like parts or components throughout the several figures. The present invention is directed to a method and system for using icons to show the validity of programming elements applicable to a computer-generated document.

Operating Environment

Figure 1:
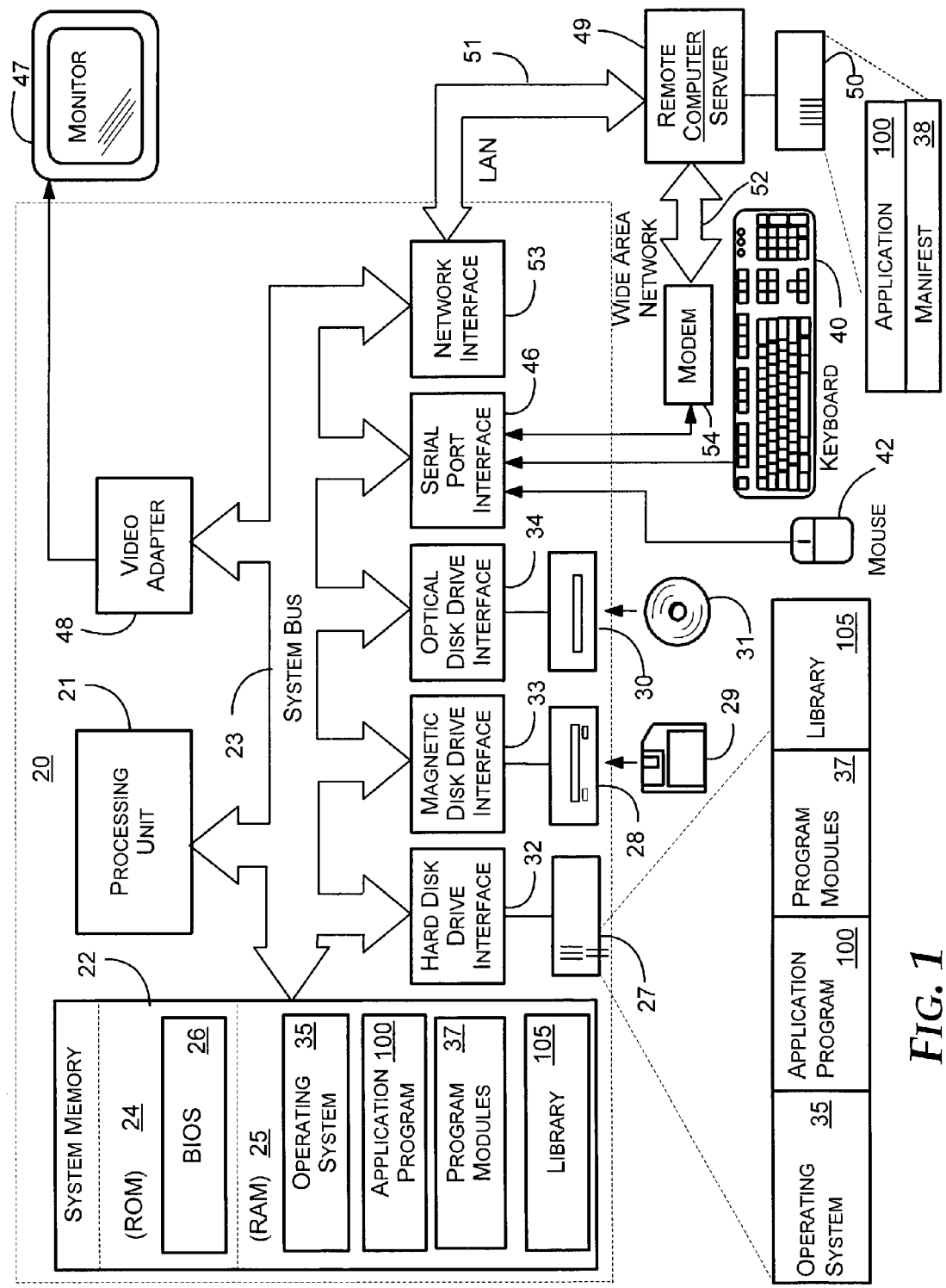
FIG. 1 is a block diagram of a computer and associated peripheral and networked devices that provide an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, a word processor program module 37 (or other type of program module), program data, such as the manifest 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Operation

Figure 2:
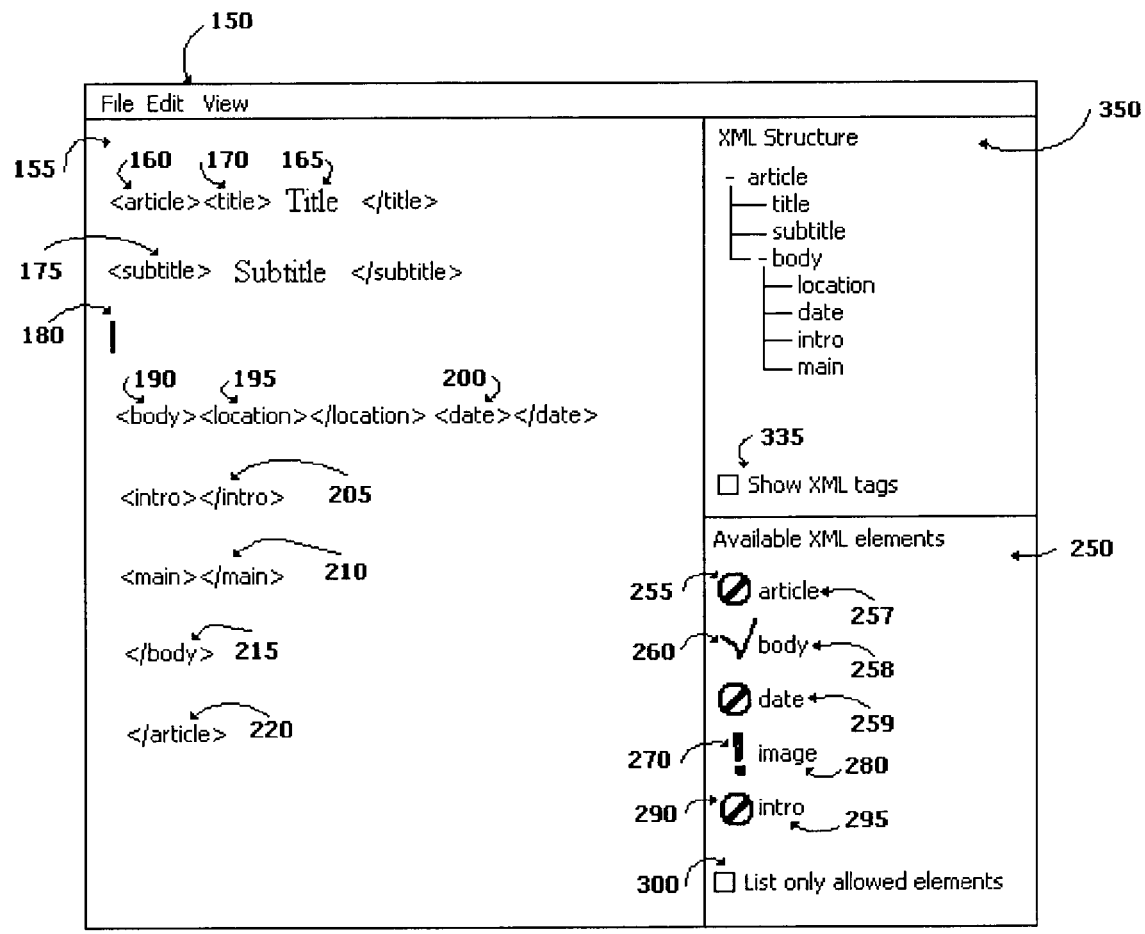
FIG. 2 illustrates a computer screen display of a software application for creating a document and annotating the document with XML structure and showing an associated application pane.

As shown in FIG. 2, an illustrative software application screen display 150 is illustrated. The screen display 150 is illustrative of a variety of software application screen displays such as a word processor display, a spreadsheet display, a web browser display, and the like. The screen displays 150 shows an exemplary word processor application display having a workspace 155 for entry and editing of a document. According to the illustrated example in FIG. 2, an article document is being created by a user having an article title 165 and an article subtitle 180. As should be understood by those skilled in the art, the text illustrated in FIG. 2 is for purposes of example only, and the data entered into the workspace 155 may be in any type of format including alpha-numeric text and images allowable by the software application under which the document is created.

As shown in the workspace 155, a number of Extensible Markup Language (XML) elements are shown annotating the document. For example, <article> tag 160 is included at the beginning and end of the document to define the document as an "article" document, and a variety of other elements such as a <body> element and an <intro> element are included inside the article structure. As is well known to those skilled in the art, XML annotation of the document allows the user to define portions of the document with certain data types and data structure. For example, the user may define the portion of the document inside the <title> element for including data of the type "title" and including a prescribed allowable structure for the title.

In order to provide the document with a set of grammatical rules governing the types and structure of data that may be included in a given document such as the article document shown in FIG. 2, an XML schema is attached to or associated with the document for providing the rules governing each of the XML elements with which a user may annotate a given document. For example, the article document may have an attached or associated schema file such as "article-schema.xsd" for providing the allowable set of XML elements such as <article>, <title>, <body>, and so on. The schema file will include the rules governing the order with which those elements may be applied to a document and specific rules associated with individual elements applied to the document. For example, a schema attached to or associated with the article document, illustrated in FIG. 2, may prescribe that data associated with the <date> element must include the day element, followed by the month element, and followed by the year element. Additionally, the schema may require that data associated with the <date> element must follow the <location> element.

As is understood by those skilled in the art, developers of XML schema files determine the names of XML elements and the associated data types and data structures allowed for those elements. Then, all users of documents annotated with XML structure according to a given schema file may utilize the data contained within the XML structure without regard for the overall type and structure of the document. For example, if the article document, illustrated in FIG. 2, is transmitted to a publisher of the article document, the publisher may develop software applications for parsing the document to locate specific types of data within the document for use by the publisher. The publisher may, for example, only wish to publish the article title as an advertisement for the future publication of the whole article. Using the schema file attached to the article document, the publisher will know that the data associated with the XML element <title> has been prepared according to the schema file governing the document. Accordingly, the publisher may develop a software application for locating the <title> element and for extracting the data associated therewith for insertion into the publisher's own document for using that data as an advertisement for the future publication of the whole article.

The publisher may extract this data without regard to other aspects of the document such as the location of and data contained within the "body" section. This is made possible by the fact that each user of the document follows the data type and data structure rules prescribed in the schema file attached to or associated with the document. The schema file may be attached to the document, or the schema file may be maintained in a separate location such as a library of schema files accessible by the document. That is, the document may contain a file path pointer or a unique namespace identifier (e.g. URI or URN) for locating and/or identifying the schema file for providing the document rules governing the XML structure of the document.

Referring still to FIG. 2, an XML structure pane 350 is illustrated for showing the user the structure of XML elements applied to the document by the user. As shown below, the XML structure pane, a checkbox 355 is provided for allowing the user to elect to show the XML tags in the document. If the checkbox 355 is not checked, the XML tags illustrated in the work area 155 will not be shown to the user.

According to an embodiment of the present invention, an XML element application pane 250 is provided to the user for showing the user potential XML elements that may be applied to the document in accordance with the schema file associated with the document. For example, as illustrated in the application pane 250, an <article> element 257, a <body> element 258, a <date> element 259, an <image> element 280, and an <intro> element 295 are displayed. Below the application pane 250 is a checkbox 300 specifying whether all XML elements prescribed by the schema file governing the document should be displayed, or whether only allowed XML elements that may be applied to the document in relation to the current editing context and location in the document should be displayed.

If the user checks the checkbox 300, only allowed elements associated with the cursor location are displayed in the application pane 250. According to the exemplary document illustrated in FIG. 2, because the cursor is located within the structure defined by the <article> element, all potentially allowable elements, such as the elements 257, 258, 259, 280 that may be applied within the context of the <article> element are displayed in the application pane 250. On the other hand, if the checkbox 300 is not checked, every element that is declared in the attached schema (regardless of where the element is declared) is displayed in the application pane 250, even if they are not valid in the context of the current cursor position.

Referring still to FIG. 2, a series of icons 255, 260, 270, and 290 are displayed alongside XML elements to indicate a level of validity associated with applying the corresponding XML elements in the current editing context in the document. For example, as illustrated in FIG. 2, the cursor location is between the end tag of the <subtitle> element and the start tag of the <body> element. Because the user of the document has not checked the checkbox 300, all potential XML elements that may be applied anywhere in the document, according to the XML schema file associated with the document are displayed in the application pane 250.

Because the cursor is between the <subtitle> element and <body> element, the <article> element 257, displayed in the application pane 250, has an associated icon 255 indicating that that element is not allowed in this location of the document. Accordingly, even if the user lacks a sophisticated understanding of how to apply XML structure to the document, the user may quickly see in the application pane 250 that the <article> element should not be applied in the location of the document at which the user has the cursor for editing. If the user moves the cursor to a different location in the document, the icons presented in association with potentially applicable elements may change. The user constantly receives a helpful visual snap shot of the validity of different types of XML elements based on the current editing context of the document. The icon 260 illustrated next to the <body> element 258 may be used as an indication that the body element is required, but has already been applied to the document. The icon 270, on the other hand, may indicate that the <image> element has not been applied but is required in the current context.

Figure 3:
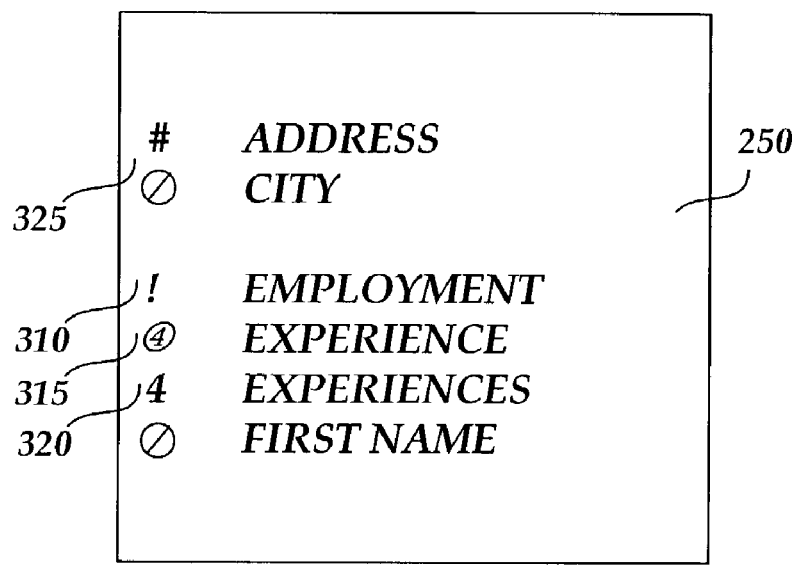
FIG. 3 is a computer screen display of an application pane according to an embodiment of the present invention for showing XML elements associated with an XML schema attached to or associated with a document being edited by a user.

Referring to FIG. 3, additional types of icons that may be presented to alert the user as to the validity of a particular XML elements based on the context of the element within the document are illustrated. In general, according to embodiments of the present invention, icons may be presented in association with different XML elements to show a variety of different levels of validity. For example, an icon such as the icon 255, illustrated in FIG. 2, may be presented to show that an XML element is not allowed in the present editing context. An icon 310, illustrated in FIG. 3, may be presented to show that the associated XML element is required in the current editing context. An icon 315, illustrated in FIG. 3, may be used to indicate that the associated XML element is allowed, but that the user has exceeded a set number of this type of element in the current context. For example, if the document being edited is a resume document containing a section for the user's experience, the schema associated with the document may prescribe that no more than four experience elements may be included in this section. Accordingly, the icon 315 may be presented to the user to alert the user that the user has already applied four <experience> elements to the resume document, and accordingly, no additional <experience> elements should be applied.

An icon 320 may be applied to alert the user of additional elements of this type that may be included. For example, if the schema associated with this document allows four <experience> items, the icon 320 may change as <experience> elements are applied to the document. That is, after the user applies one <experience> element, the icon 320 may be changed to indicate that three additional elements are allowed, and so on. An icon 325 may be illustrated to show that a given XML element is allowable in the current context, but in a different order. For example, if the XML schema associated with a resume document requires or allows an <address> element to be included after an <experience> element, but the user's cursor is placed before the <experience> element in the document, the icon 325 may be displayed to show the user that an <address> element is allowable in the "experience" element, but not before the <experience> start tag. As described above with reference to FIG. 2, an icon 260 may be displayed to indicate that a required element has already been applied to the document.

The functionality of the present invention provides the user with help information associated with XML elements that may be applied to a document according to the schema governing the document. The user is not prohibited from annotating the document with an XML element contrary to the icon displayed in the application pane 250. That is, if a given element is displayed with an icon indicating that the element is not allowable, the user may nonetheless annotate the document with that element and subsequently modify the document so that that element is allowable according to the schema governing the document. The icons illustrated in the application pane 250 provide the user with information as to the validity of given elements based on the editing context of the document, but do not actually interrupt the user's ability to annotate the document with XML structure as desired by the user.

As should be understood by those skilled in the art, the functionality of the present invention is not restricted to providing help information to users for annotating a document with Extensible Markup Language elements. According to an alternative embodiment, the application pane 250 may be populated with help information associated with attributes that may be applied to particular XML elements such as a "layout" attribute that is required according to the schema file associated with the document. The application pane 250 may include a list of attributes such as the "layout" attribute along with associated icons indicating the validity of the attributes with respect to the current editing position and context in the document. As should be understood, different validity levels and different icons may be associated with attributes depending on the nature of the attribute. For example, a particular attribute, such as a layout attribute, may only have two validity levels, such as required or not required.

The functionality of the present invention may be utilized in any context in which a user needs or requires help information associated with the application of a structure or functionality to a document according to a set of predefined rules for applying the structure or functionality to the document. For example, if the user is utilizing a graphics software application, and the user is attempting to place one graphical icon, such as a text box, outside of another graphical icon such as a dialogue box, an application pane, such as the application pane 250, may be displayed showing that the textbox is allowable, but that the text box should be inserted inside the dialogue box. As with the discussion of XML structure annotation above, the rules or suggestions governing the placement of text box with respect to dialogue boxes may be checked prior to displaying the help content in the application pane 250.

According to an embodiment of the present invention, the functionality provided in the application pane 250 may be provided to the user via a modular software program such as an application programming interface of dynamically-linked library accessible by the software application in use for providing the application pane functionality to the user. That is, a file path pointer may be attached to documents created for pointing the document to an associated software routine, application programming interface, or DLL to make the help information contained in the application pane 250 available to the user upon demand by the user.

Figure 4:
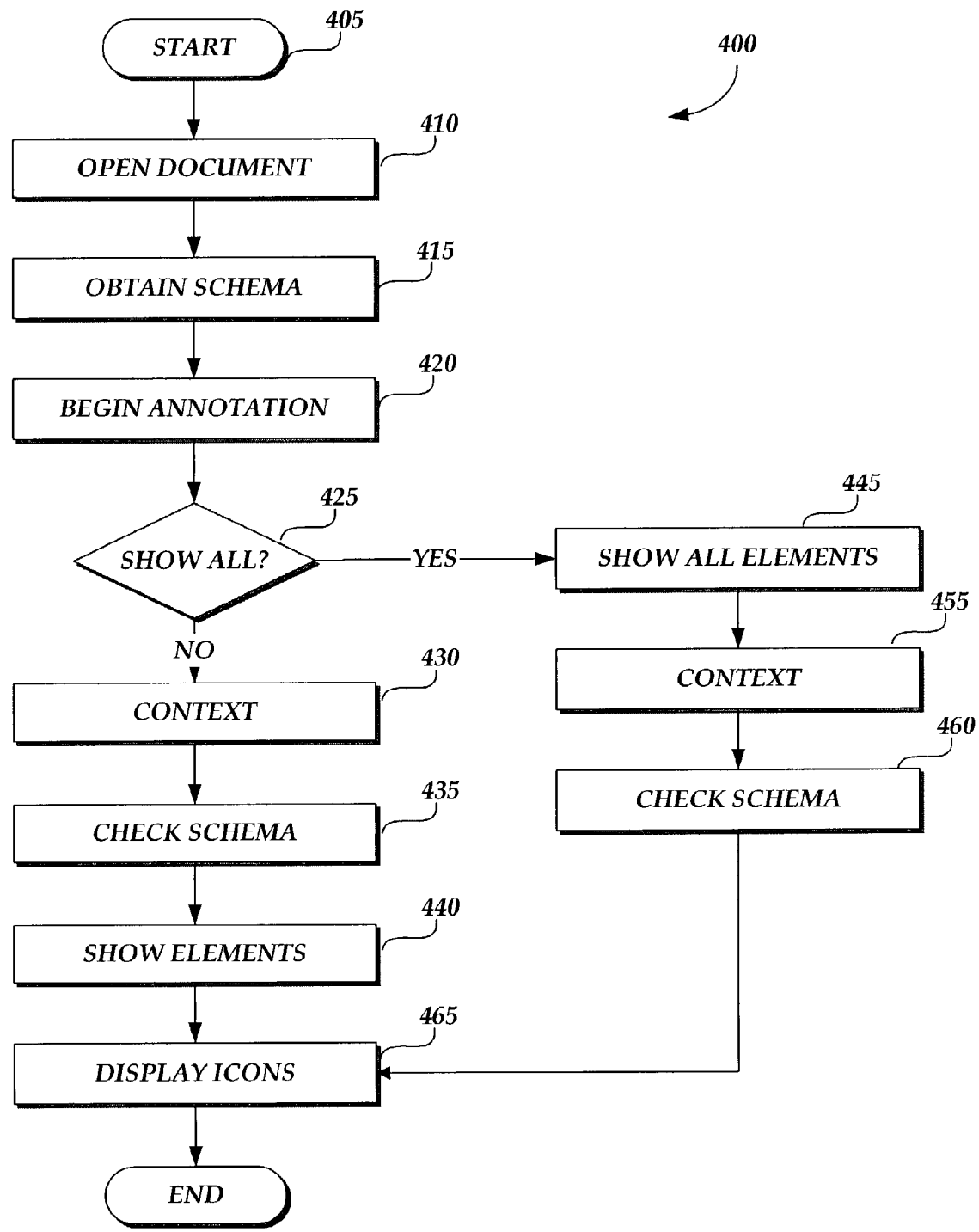
FIG. 4 is a flow chart illustrating a method for providing help functionality for annotating a document with XML elements according to an embodiment of the present invention.

FIG. 4 is a flow chart illustrating a method for providing help functionality for annotating a document with XML structure according to an embodiment of the present invention. By way of example only, FIG. 4 is described with reference to the illustrative article document shown in FIG. 2. As should be understood, the description of FIG. 4 is equally applicable to any document with which the user desires to annotate with a markup language structure, such as XML, according to embodiments of the present invention. The method 400 begins at start step 405 and proceeds to step 410 where the user opens the article document, illustrated in FIG. 2, using her word processing application 150 for editing the document. At step 415, the user desiring to annotate the document with XML structure, obtains the XML schema file associated with the document. As should be understood, the article document being edited by the user may have an associated schema file that is already attached to or associated with the document such that the document includes a file path pointer to the schema file to obtain the use of the schema file for governing XML annotation of the document. Alternatively, the user may have received the document without an associated schema file or the user may have created the article document as an original document, and a schema file may not yet exist. Therefore, at step 415, if the user wants to take advantage of the element suggestions (icons), a schema file must be present. If a schema file is not already attached to the document, or if the document does not reference a schema namespace that the application creating the document is aware of, the user must obtain an appropriate schema file or create a schema file. Otherwise, the application creating the document will not be able to tell the user via the application pane 250 which elements are allowed and/or in which locations those elements may be applied. For example, the user may be able to obtain from a remote source and download to her computer 20 a schema file previously developed for preparing an article document such as the article document illustrated in FIG. 2.

At step 420, the user begins to annotate the document with XML elements so that subsequent users of the document may utilize data contained in the document in accordance with the XML structure with which the user annotates the document. For example, if the user is preparing the article document for a publisher, the publisher may require that the document be annotated according to a particular XML schema file so that the publisher may quickly and easily extract the required data from the document after the document is transmitted to the publisher from the user. At step 425, a determination is made as to whether the user would like the application pane 250 to show the user all XML elements that appear in the attached schema, or whether the user desires that only elements that may be validly applied at the current editing context be displayed. If the user does not wish to have all XML elements appearing in the attached schema displayed in the application pane 250, the user may check the checkbox 300 to require that only allowable elements related to the editing context be displayed.

At step 430, a determination is made as to the current editing context of the document. For example, as illustrated in FIG. 2, the user has placed the cursor 185 within the <article> element of the document. Accordingly, XML elements allowable within that element will be displayed in the application pane 250. If the checkbox 300 was checked, then only XML elements available as children of the element at the current location are listed. Otherwise, the list consists of all the elements referenced by the schema, including those that could not under any circumstances be valid children of the element at the current location. It should be understood that some of the elements displayed in the application pane 250 may be indicated with an icon, such as the icon 255 to show that the particular XML element is not allowable for the given location of the cursor. That element is nonetheless listed in the application pane 250 because <date> could potentially be a child of <article>, even though it is not valid at this particular location. Because the user has checked the checkbox 300, potential XML elements applicable somewhere in the document, but not as direct children of the <article> element are not displayed in the application pane 250.

At step 435, the schema file associated with the document is checked to determine which potential XML elements to display in the application pane 250 along with the associated validity of those elements based on the current editing position in the document. At step 440, the application pane 250 is populated with context-based elements and associated validity. For example, because the <body> element 258 has already been applied to the document, an icon 260 is displayed to show that element has already been applied. Because the cursor position is between the <subtitle> and the <body> elements, the <article> element 257 is displayed with an icon showing that that element is not allowed at this particular editing position. At step 465, associated icons are displayed next to respective elements.

Referring back to step 425, if the user elects to show all potentially applicable XML elements, the user does not check the checkbox 300. As a result, all potentially allowable XML elements allowed by the schema file governing the XML structure of the document are presented in the application pane 250 in alphabetical order. That is, even though the user's current editing position is within the <article> section of the document, potentially allowable elements that may be applied to the document in other sections of the document are also displayed in the application pane 250. At step 445, a determination is made as to the current editing position in the document. At step 460, the schema file is checked to determine the validity level of XML elements based on the current editing position. At step 465, the appropriate icon is displayed next to a corresponding XML element in the application pane 250.

As described above, a variety of different icons may be displayed adjacent to associated XML elements based on the editing position and context in the document. As the user moves the cursor to a different location, the schema file is checked to determine the validity level of potentially allowable XML elements based on the new editing context. More than one icon, or combinations of icons, may be used if there is more than one factor or validity level that should be provided to the user. For example, an icon showing the user that no more than four of a certain element may be applied may be provided in combination with an icon showing that the element should not be applied in the current editing context. An XML element may be associated with an icon indicating that element is not allowable in a particular editing context, but once the user moves the cursor to a different location, a new icon may be displayed showing the XML element is actually required in the new editing context. In accordance with the embodiments of the present invention, the user receives help information to assist the user in annotating a given document with a markup XML language structure, by indicating to the user the validity of the markup language elements for application to the document based on the user's current editing position within the document. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of providing contextually sensitive user assistance for structuring a computer-generated document, comprising:

attaching a schema to the document defining rules associated with markup language elements to be applied to the document;

determining a current editing context in the document;

determining from the schema potential markup language elements that may be applied to the document based on the current editing context in the document;

displaying a list of the potential markup language elements that may be applied to the document based on the current editing context in the document wherein the displayed list of the potential markup language elements comprises elements allowed within a structure associated with an editing point in the document corresponding to a location of a computer-generated cursor wherein displaying the list of the potential markup language elements that may be applied to the document comprises displaying the list of the potential markup language elements that may be applied to the document when the computer-generated cursor is located within the structure; and displaying an indicator associated with each of the potential markup language elements, wherein the indicator indicates a validity level associated with applying each of the potential markup language elements to the document based on the current editing context.

2. The method of claim 1, whereby the step of attaching a schema to the document includes attaching a schema to the document defining permissible data structure, data type, and data content associated with the markup language elements that may be applied to the document.

3. The method of claim 1, whereby the step of determining the current editing context in the document includes determining the editing point in the document including the location of the computer-generated cursor.

4. The method of claim 1, prior to the step of determining the current editing context in the document, selecting help information associated with the markup language elements to be applied to the document according to the schema.

5. The method of claim 1, further comprising selecting help information associated with the potential markup language elements that are allowable based on the current editing context in the document.

6. The method of claim 1, prior to the step of displaying an indicator associated with each of the potential markup language elements, further comprising reading the schema to determine the validity level associated with each of the potential markup language elements to be displayed.

7. The method of claim 1, whereby the step of displaying a list of the potential markup language elements that may be applied to the document based on the current editing context of the document includes displaying a list of the potential markup language elements that may be applied to the document based on the current editing context in the document and according to the schema.

8. The method of claim 1, further comprising displaying a list of the markup language elements to be applied to the document according to the schema.

9. The method of claim 1, whereby the step of displaying an indicator associated with each of the potential markup language elements includes displaying an indicator associated with each of the potential markup language elements, wherein the indicator indicates a validity level associated with applying each of the potential markup language elements to the document based on the current editing context including a position in the document of a computer-generated cursor.

10. The method of claim 1, whereby the step of displaying an indicator associated with each of the potential markup language elements includes displaying a computer-generated icon adjacent to each of the displayed potential markup language elements, wherein the computer-generated icon indicates a validity level associated with applying each of the potential markup language elements to the document based on the current editing context.

11. The method of claim 10, whereby the step of displaying a computer-generated icon adjacent to each of the displayed potential markup language elements includes displaying a combination of computer-generated icons adjacent to each of the displayed potential markup language elements, wherein the combination of computer-generated icons indicate a combination of validity levels associated with applying each of the potential markup language elements to the document based on the current editing context.

12. The method of claim 10, whereby the step of displaying a computer-generated icon indicating the validity level includes:

displaying an icon indicating that a potential markup language element is not allowed.

13. The method of claim 10, whereby the step of displaying a computer-generated icon indicating the validity level includes:

displaying an icon indicating that a potential markup language element is required.

14. The method of claim 10, whereby the step of displaying a computer-generated icon indicating the validity level includes:

displaying an icon indicating that a potential markup language element is allowed, but that application of the potential markup language element has exceeded an allowable number of the potential markup language element based on the current editing context.

15. The method of claim 10, whereby the step of displaying a computer-generated icon indicating the validity level includes:

displaying an icon indicating that a potential markup language element is required and has been applied to the document correctly based on the current editing context.

16. The method of claim 10, whereby the step of displaying a computer-generated icon indicating the validity level includes:

displaying an icon indicating that a potential markup language element is allowed, but in a different order.

17. The method of claim 10, whereby the step of displaying a computer-generated icon indicating the validity level includes:

displaying an icon indicating that a potential markup language element may be applied a set number of times based on the current editing context.

18. The method of claim 10, whereby the step of displaying a computer-generated icon indicating the validity level includes:

displaying an icon indicating that a potential markup language element is required based on the current editing context, but only after another markup language element is applied.

19. The method of claim 1, further comprising the step of changing to a different current editing context in the document.

20. The method of claim 19, whereby in response to changing to the different current editing context, displaying a list of potential markup language elements that may be applied to the document based on the different current editing context.

21. The method of claim 20, further comprising, displaying an indicator associated with each of the potential markup language elements that may be applied to the document based on the different current editing context, wherein the indicator indicates a validity level associated with applying each of the potential markup language elements to the document based on the different current editing context.

22. The method of claim 21, whereby prior to the step of displaying an indicator associated with each of the potential markup language elements, checking the schema to determine the validity level associated with each of the potential markup language element based on the different current editing context.

23. The method of claim 1, further comprising selecting help information associated with the potential XML elements that are allowable based on the current editing context in the document.

24. A method of providing contextually sensitive user assistance for structuring a computer-generated document, comprising:

attaching a schema to the document defining rules associated with Extensible Markup Language (XML) elements to be applied to the document;

determining a current editing context in the document;

determining from the schema potential XML elements that may be applied to the document based on the current editing context in the document;

displaying a list of the potential XML elements that may be applied to the document based on the editing context in the document wherein the displayed list of the potential XML elements comprises elements allowed within a structure associated with an editing point in the document corresponding to a location of a computer-generated cursor wherein displaying the list of the potential XML elements that may be applied to the document comprises displaying the list of the potential XML elements that may be applied to the document when the computer-generated cursor is located within the structure; and displaying an indicator associated with each of the potential XML elements, wherein the indicator indicates a validity level associated with applying each of the potential XML elements to the document based on the current editing context.

25. The method of claim 24, whereby the step of attaching a schema to the document includes attaching a schema to the document defining permissible data structure, data type, and data content associated with the XML elements that may be applied to the document.

26. The method of claim 24, whereby the step of determining the current editing context in the document includes determining the editing point in the document including the location of the computer-generated cursor.

27. The method of claim 24, prior to the step of determining the current editing context in the document, selecting help information associated with the XML elements that may be applied to the document according to the schema.

28. The method of claim 24, prior to the step of displaying an indicator associated with each of the potential XML elements, further comprising reading the schema to determine the validity level associated with each of the potential XML elements to be displayed.

29. The method of claim 24, whereby the step of displaying a list of the potential XML elements that may be applied to the document based on the current editing context of the document includes displaying a list of the potential XML elements that may be applied to the document based on the current editing context in the document and according to the schema.

30. The method of claim 24, further comprising displaying a list of the XML elements to be applied to the document according to the schema.

31. The method of claim 24, whereby the step of displaying an indicator associated with each of the potential XML elements includes displaying an indicator associated with each of the potential XML elements, wherein the indicator indicates a validity level associated with applying each of the potential XML elements to the document based on the current editing content including a position in the document of a computer-generated cursor.

32. The method of claim 24, whereby the step of displaying an indicator associated with each of the potential XML elements includes displaying a computer-generated icon adjacent to each of the displayed potential XML elements, wherein the computer-generated icon indicates a validity level associated with applying each of the potential XML elements to the document based on the current editing context.

33. The method of claim 32, whereby the step of displaying a computer-generated icon adjacent to each of the displayed potential XML elements includes displaying a combination of computer-generated icons adjacent to each of the displayed potential XML elements, wherein the combination of computer-generated icons indicate a combination of validity levels associated with applying each of the potential XML elements to the document based on the current editing context.

34. The method of claim 32, whereby the step of displaying a computer-generated icon indicating the validity level includes:

displaying an icon indicating that a potential XML element is not allowed;

displaying an icon indicating that a potential XML element is required;

displaying an icon indicating that a potential XML element is allowed, but that application of the potential XML element has exceeded an allowable number of the potential XML element based on the current editing context;

displaying an icon indicating that a potential XML element is required and has been applied to the document correctly based on the current editing context;

displaying an icon indicating that a potential XML element is allowed, but in a different order;

displaying an icon indicating that a potential XML element may be applied a set number of times based on the current editing context; and displaying an icon indicating that a potential XML element is required based on the current editing context, but only after another XML element is applied.

35. The method of claim 24, further comprising the step of changing to a different current editing context.

36. The method of claim 35, whereby in response to changing to the different current editing context, displaying a list of potential XML elements that may be applied to the document based on the different current editing context.

37. The method of claim 36, further comprising, displaying an indicator associated with each of the potential XML elements that may be applied to the document based on the different current editing context, wherein the indicator indicates a validity level associated with applying each of the potential XML elements to the document based on the different current editing context.

38. The method of claim 37, whereby prior to the step of displaying an indicator associated with each of the potential XML elements that may be applied to the document based on the different current editing context, checking the schema to determine the validity level associated with each of the potential XML elements based on the different current editing context.

39. A computer readable medium containing instructions which when performed by a computer perform a method for providing contextually sensitive user assistance for structuring a computer-generated document, the method comprising:

attaching an Extensible Markup Language (XML) schema to the document defining rules associated with XML elements to be applied to the document;

determining a current editing context in the document;

determining from the schema potential XML elements that may be applied to the document based on the current editing context in the document;

displaying a list of the potential XML elements that may be applied to the document based on the current editing context in the document wherein the displayed list of the potential XML elements comprises elements allowed within a structure associated with an editing point in the document corresponding to a location of a computer-generated cursor wherein displaying the list of the potential XML elements that may be applied to the document comprises displaying the list of the potential XML elements that may be applied to the document when the computer-generated cursor is located within the structure and when a user input indicates that only allowed elements are to be displayed within the structure; and displaying an indicator associated with each of the potential XML elements, wherein the indicator indicates a validity level associated with applying each of the potential XML element to the document based on the current editing context.

40. The computer-readable medium of claim 39, prior to the step of displaying an indicator associated with each of the potential XML elements, further comprising reading the XML schema to the validity level associated with each of the potential XML elements to be displayed.

41. The computer-readable medium of claim 39, whereby the step of displaying an indicator associated with each of the potential XML elements includes displaying an indicator associated with each of the potential XML elements, wherein the indicator indicates a validity level associated with applying each of the potential XML elements to the document based on the current editing context including the location in the document of the computer-generated cursor.

42. The computer-readable medium of claim 39, whereby the step of displaying an indicator associated with each of the potential XML elements includes displaying a computer-generated icon adjacent to each of the displayed potential XML elements, wherein the computer-generated icon indicates a validity level associated with applying each of the potential XML elements to the document based on the current editing context.

43. The computer-readable medium of claim 42, whereby the step of displaying a computer-generated icon indicating the validity level includes:

displaying an icon indicating that a potential XML element is not allowed;

displaying an icon indicating that a potential XML element is required;

displaying an icon indicating that a potential XML element is allowed, but that application of the XML element has exceeded an allowable number of the potential XML elements based on the current editing context;

displaying an icon indicating that a potential XML element is required and has been applied to the document correctly based on the current editing context;

displaying an icon indicating that a potential XML element is allowed, but in a different order;

displaying an icon indicating that a potential XML element may be applied a set number of times based on the current editing context; and displaying an icon indicating that a potential XML element is required based on the current editing context, but only after another XML element is applied.

44. The computer-readable medium of claim 39, further comprising the steps of:

changing to a different current editing context in the document;

displaying a list of potential XML elements that may be applied to the document based on the different current editing context;

checking the XML schema to determine a validity level associated with each of the potential XML elements that may be applied to the document based on the different current editing context; and displaying an indicator associated with each of the potential XML elements, wherein the indicator indicates the validity level associated with applying each of the potential XML elements to the document based on the different current editing context.

45. A method of providing contextually sensitive user assistance for structuring a computer-generated document, comprising:

attaching a set of rules to the document associated with elements to be applied to the document;

determining a current editing context in the document;

determining from the set of rules potential elements that may be applied to the document based on the current editing context in the document;

displaying a list of the potential elements that may be applied to the document based on the editing context in the document wherein the displayed list of the potential elements comprises elements allowed within a structure associated with an editing point in the document corresponding to a location of a computer-generated cursor wherein displaying the list of the potential markup language elements that may be applied to the document comprises displaying the list of the potential markup language elements that may be applied to the document when the computer-generated cursor is located within the structure and when a user input indicates that only allowed elements are to be displayed within the structure; and displaying an indicator associated with each of the potential elements, wherein the indicator indicates a validity level associated with applying each of the potential elements to the document based on the current editing context and based on the set of rules.

46. The method of claim 45, whereby the step of attaching a set of rules to the document includes attaching a set of rules to the document defining permissible data structure, data type, and data content associated with the elements that may be applied to the document.

47. The method of claim 45, whereby the step of displaying an indicator associated with each of the potential elements includes displaying a computer-generated icon adjacent to each of the displayed potential elements, wherein the computer-generated icon indicates a validity level associated with applying each of the potential elements to the document based on the current editing context.

48. The method of claim 47, whereby the step of displaying a computer-generated icon adjacent to each of the displayed potential elements includes displaying a combination of computer-generated icons adjacent to each of the displayed potential elements, wherein the combination of computer-generated icons indicate a combination of validity levels associated with applying each of the potential elements to the document based on the current editing context.

* * * * *